Feb. 7, 1939. C. J. O'ROURKE 2,146,090
BUMPER FOR VEHICLE DOORS
Filed May 25, 1938
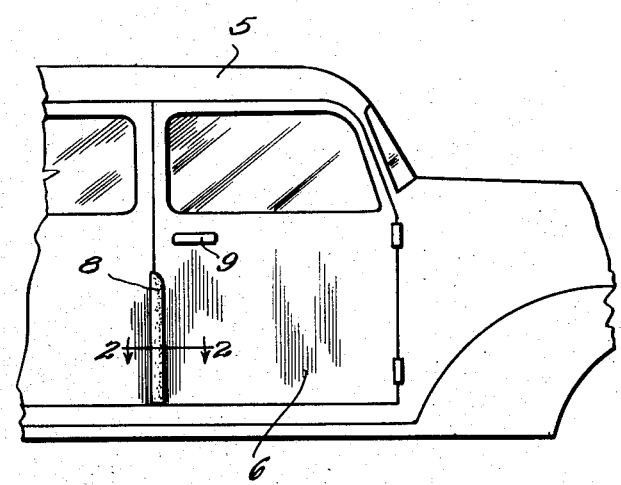
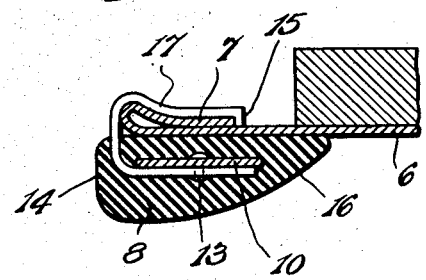
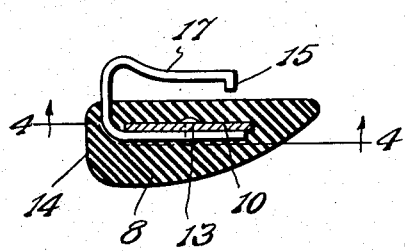
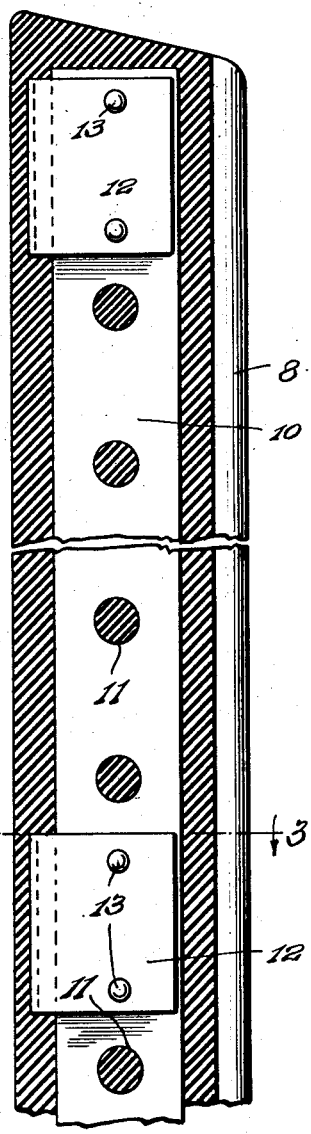
Inventor
Carl J. O'Rourke.
By Lacey & Lacey, Attorney Patented Feb. 7, 1939

2,146,090

UNITED STATES PATENT OFFICE 2,146,090

BUMPER FOR VEHICLE DOORS

Carl J. O'Rourke, Danville, Ohio

Application May 25, 1938, Serial No. 21

6 Claims. (Cl. 16—86)

This invention relates to bumpers and more particularly to a bumper especially designed for attachment to vehicle doors.

The object of the invention is to provide the bumper of simple and inexpensive construction capable of being quickly attached to the outer edge of the swinging door of an automobile or other vehicle and which will positively prevent chipping, scarring or other damage to the finish to the door or to the fender of an adjacent automobile when two or more automobiles are parked close together and the door of either automobile is opened.

A further object is to provide a detachable bumper including a resilient impact member having spaced attaching clips embedded therein and provided with terminal laterally extending lugs adapted to engage the inturned edge of an automobile for securing the bumper in position and preventing accidental displacement thereof.

A further object is to strengthen the bumper by the provision of a reinforcing bar embedded in the rubber or other resilient material and to which the attaching clips are fastened, the construction of the device being such as to permit the bumper to be conveniently attached to an automobile door without the necessity of drilling holes in the door or the employment of screws, nails or similar fastening devices.

A still further object of the invention is generaly to improve this class of devices so as to increase their utility, durability and efficiency.

In the accompanying drawing forming a part of this specification and in which similar numerals of reference indicate corresponding parts in all the figures of the drawing:

Figure 1 is a side elevation of a portion of an automobile, the door of which is equipped with a bumper constructed in accordance with the present invention, Figure 2 is a transverse sectional view taken on the line 2—2 of Figure 1, Figure 3 is a transverse sectional view taken on the line 3—3 of Figure 4, and Figure 4 is an enlarged vertical sectional view of the upper portion of the bumper.

The improved bumper forming the subject-matter of the present invention is principally designed for attachment to the swinging doors of automobiles or other conveyances, and by way of illustration is shown in connection with an automobile of conventional construction in which 5 designates the body of the vehicle and 6 the swinging door thereof having its vertical edge bent inwardly and rearwardly to form the usual reinforcing flange 7.

The device comprises a yieldable body portion 8 preferably molded or otherwise formed of rubber and extending from the lower edge of the door to a point adjacent the handle 9 thereof, as best shown in Figure 1 of the drawing. Embedded in the rubber constituting the body portion 8 is a flat reinforcing bar 10 provided with a series of perforations 11 through which the rubber extends to assist in anchoring the bar within said body portion. Secured to the reinforcing bar are a plurality of spaced resilient attaching clips 12 each having one end thereof riveted or otherwise fastened to the bar, as indicated at 13, and its other end projecting through the body portion in spaced relation to the forward edge 14 thereof and thence extended laterally and inwardly to form a lug 15 adapted to fit over and bear against the adjacent edge of the reinforcing flange 7 of the automobile door, as best shown in Figure 2 of the drawing. The body portion 8 of the bumper is inclined rearwardly, as indicated at 16, so as to produce a streamline effect and also to cause the thickest portion of the rubber to be disposed at the edge of the door and thus present a yieldable cushion to receive and absorb the impact should the door, when swung outwardly to open position, strike the fender or other portion of an adjacent car.

In applying the device to an automobile door, the inner arms 17 of the clips 12 are pressed or sprung laterally and the body portion 8 positioned along the vertical edge of the door 6 with the arms 17 bearing against the inturned portion or flange 7 of the door and with the lugs 15 engaging the vertical edge of said flange. With the bumper positioned on the door in this manner should several automobiles be parked close together and the occupant of one of the cars desires to open his or her door, the bumper will receive the swinging impact of the door and thus prevent chipping, scarring or other damage to the finish of the door or to the fender or other portion of an adjacent car should the door accidentally swing against the same, as previously stated. In order to remove the bumper, it is merely necessary to press or spring the arms 17 of the attaching clips outwardly until the lugs 15 clear the flange 7 of the door when the bumper may be quickly detached.

It will, of course, be understood that the attaching clips will be constructed to conform to the size and shape of the edge of the door to which the bumper is to be attached so as to permit the use of the device on all standard makes of automobiles. It will also be understood that said bumpers may be made in different sizes and shapes and provided with any desired number of attaching clips without departing from the spirit of the invention.

Having thus described the invention, what is claimed as new is:

1. A bumper comprising a yieldable body portion, and a plurality of resilient attaching clips secured to the body portion and adapted to fit over and yieldably engage the outer vertical edge of a swinging vehicle door.

2. A bumper comprising a yieldable body portion having its front edge thickened and tapered towards its rear edge, a reinforcing bar embedded in said body portion, and a plurality of attaching clips secured to the reinforcing bar and adapted to fit over and engage the outer vertical edge of a swinging vehicle door.

3. A bumper comprising an elongated yieldable body portion, a perforated reinforcing bar embeded in the body portion, and a plurality of attaching clips secured to the reinforcing bar and provided with resilient arms adapted to extend over and yieldably engage the outer vertical edge of a swinging vehicle door.

4. A bumper comprising an elongated cushioning body, a reinforcing bar embedded within the body, and spaced attaching clips secured to the reinforcing bar and provided with laterally extended arms terminating in inwardly extending stop lugs for engagement with the reinforcing flange on the outer vertical edge of a swinging vehicle door.

5. As a new article of manufacture, a bumper for vehicle doors comprising a vertically disposed yieldable body portion having its forward edge thickened and its rear edge inclined in the direction of said thickened portion, a reinforcing bar embedded in the body portion for approximately the entire length thereof and provided with spaced perforations receiving the material of which the body portion is formed, and a plurality of resilient attaching clips each having one end thereof rigidly secured to the reinforcing bar and its other end projected beyond the inner face of the body portion and thence extended laterally to form a spring arm terminating in an inwardly extending stop lug.

6. A bumper comprising a yieldable body portion, and attaching clips secured to the body portion and adapted to fit over and engage the outer vertical edge of a swinging vehicle door.

CARL J. O'ROURKE.